United States Patent
Li et al.

(10) Patent No.: US 11,945,751 B2
(45) Date of Patent: Apr. 2, 2024

(54) CALCIUM ALUMINATE CEMENT AND CALCIUM SULFOALUMINATE CEMENT CATALYSTS IN GYPSUM PANELS AND USE THEREOF

(71) Applicant: KNAUF GIPS KG, Iphofen (DE)

(72) Inventors: Qinghua Li, Rolling Meadows, IL (US); Ashish Dubey, Grayslake, IL (US); Nicholas D'anna, Mundelein, IL (US)

(73) Assignee: KNAUF GIPS KG, Iphofen (DE)

( * ) Notice: Subject to any disclaimer, the term of this patent is extended or adjusted under 35 U.S.C. 154(b) by 288 days.

(21) Appl. No.: 17/245,862

(22) Filed: Apr. 30, 2021

(65) Prior Publication Data
US 2022/0194856 A1    Jun. 23, 2022

Related U.S. Application Data (60) Provisional application No. 63/128,270, filed on Dec. 21, 2020.

(51) Int. Cl.
*C04B 28/14*    (2006.01)
*B28B 1/16*    (2006.01)
(Continued)

(52) U.S. Cl.
CPC ............... *C04B 28/14* (2013.01); *B28B 1/16* (2013.01); *B28B 19/0015* (2013.01);
(Continued)

(58) Field of Classification Search
CPC ..... C04B 28/14; C04B 24/42; C04B 40/0046; B28B 1/16; B28B 19/0015; B32B 9/005
See application file for complete search history.

(56) References Cited

U.S. PATENT DOCUMENTS

| | | |
|---|---|---|
| 2,078,199 A | 4/1937 | King |
| 3,573,947 A | 4/1971 | Kinkade et al. |

(Continued)

FOREIGN PATENT DOCUMENTS

| | | |
|---|---|---|
| CN | 110759693 A | 2/2020 |
| EP | 1112986 A1 | 7/2001 |

(Continued)

OTHER PUBLICATIONS

International Search Report dated Apr. 11, 2022 to KNAUF GIPS KG for PCT/IB2021/062113 filed Dec. 21, 2021.

(Continued)

*Primary Examiner* — John E Uselding
(74) *Attorney, Agent, or Firm* — Vorys, Sater, Seymour and Pease LLP; Pradip Sahu; Philip T. Petti

(57) ABSTRACT

Water-resistant gypsum products may be produced using a novel catalyst that includes calcium aluminate cement and/or calcium sulfoaluminate cement. For example, a water-resistant gypsum panel may have a core comprising: interwoven matrices of calcium sulfate dihydrate crystals and a silicone resin, wherein the interwoven matrices have dispersed throughout them a siloxane polymerization catalyst comprising (a) 55 wt % to 100 wt % calcium aluminate cement and/or calcium aluminate cement and (b) 0 wt % to 45 wt % and magnesium oxide, wherein the weight ratio of the siloxane polymerization catalyst to the calcium sulfate dihydrate is 0.01-5:100. The water-resistant gypsum panel may have an absence of one or more of: Portland cement, limestone, aragonite, calcite, dolomite, and slaked lime.

19 Claims, 1 Drawing Sheet

(51) Int. Cl.
*B28B 19/00* (2006.01)
*B32B 9/00* (2006.01)
*C04B 24/42* (2006.01)
*C04B 40/00* (2006.01)
C04B 103/12 (2006.01)
C04B 103/40 (2006.01)
C04B 111/00 (2006.01)
C04B 111/27 (2006.01)

(52) U.S. Cl.
CPC .............. *B32B 9/005* (2013.01); *C04B 24/42* (2013.01); *C04B 40/0046* (2013.01); *B32B 2607/00* (2013.01); *C04B 2103/12* (2013.01); *C04B 2103/408* (2013.01); *C04B 2111/0062* (2013.01); *C04B 2111/27* (2013.01)

(56) References Cited

U.S. PATENT DOCUMENTS

| | | |
|---|---|---|
| 5,320,677 A | 6/1994 | Baig |
| 5,683,635 A | 11/1997 | Sucech et al. |
| 6,342,284 B1 | 1/2002 | Yu et al. |
| 6,409,825 B1 | 6/2002 | Yu et al. |
| 6,632,550 B1 | 10/2003 | Yu et al. |
| 6,893,752 B2 | 5/2005 | Veeramasuneni et al. |
| 7,803,226 B2 | 9/2010 | Wang et al. |
| 7,811,685 B2 | 10/2010 | Wang et al. |
| 7,815,730 B2 | 10/2010 | Wang et al. |
| 7,892,472 B2 | 2/2011 | Veeramasuneni et al. |
| 8,034,203 B2 | 10/2011 | Xu et al. |
| 8,070,895 B2 | 12/2011 | Engbrecht et al. |
| 8,088,218 B2 | 1/2012 | Blackburn et al. |
| 8,133,600 B2 | 3/2012 | Wang et al. |
| 8,501,074 B2 | 8/2013 | Wang et al. |
| 8,568,544 B2 | 10/2013 | Engbrecht et al. |
| 10,442,732 B2 | 10/2019 | Mlinska et al. |
| 2006/0035112 A1 | 2/2006 | Veeramasuneni et al. |
| 2007/0022913 A1* | 2/2007 | Wang ...................... C04B 28/14 |
| | | 106/697 |
| 2015/0306846 A1 | 10/2015 | Xu et al. |
| 2017/0107151 A1 | 4/2017 | Hajakian et al. |
| 2018/0118940 A1 | 5/2018 | Kang et al. |

FOREIGN PATENT DOCUMENTS

| | | |
|---|---|---|
| JP | H09142915 A | 6/1997 |
| JP | H11209160 A | 8/1999 |

OTHER PUBLICATIONS

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.

Burrows, "A Decade's Experience of Gypsum Board Weight Reduction in the U.S.", 14. Internationale Baustofftagung (Weimar, Sep. 20-23, 2000), 1.0197-1.0207.

Machine translation of Japanese patent application No. JP 11-209160A to Miyaki et al. (Elf Atochem Japan KK), published Aug. 3, 1999, from J-Plat Pat Japan Platform for Patent Information, URL:<https://www.j-platpat.inpit.go.jp/p0200>, retrieved from the Internet Aug. 11, 2023.

* cited by examiner

CALCIUM ALUMINATE CEMENT AND CALCIUM SULFOALUMINATE CEMENT CATALYSTS IN GYPSUM PANELS AND USE THEREOF

FIELD OF THE INVENTION

The present disclosure relates to compositions and methods relating to water-resistant gypsum products, typically water-resistant gypsum panels. More specifically, the present disclosure uses a novel catalyst that includes calcium aluminate cement and/or calcium sulfoaluminate cement.

BACKGROUND OF THE INVENTION

Many well-known useful construction products contain set gypsum (calcium sulfate dihydrate) as a significant, and often as the major, component. For example, set gypsum is the major component of paper-faced gypsum boards employed in typical drywall construction of interior walls. It is also the major component of gypsum/cellulose fiber composite boards and products, as described in U.S. Pat. No. 5,320,677. It is used primarily as an interior wall and ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

Gypsum is also known as calcium sulfate dihydrate, terra alba or landplaster. Synthetic gypsum, which is a byproduct of flue gas desulfurization processes from power plants, may also be used. Calcined gypsum is also known as stucco, Plaster of Paris, calcium sulfate hemihydrate, calcium sulfate half-hydrate, or calcium sulfate semihydrate. When it is mined, raw gypsum is generally found in the dihydrate form. In this form, there are approximately two water molecules of water associated with each molecule of calcium sulfate.

In order to produce the hemihydrate form (as in calcined gypsum), the gypsum can be calcined to drive off some of the water of hydration by the following equation: $CaSO_4.2H_2O \rightarrow CaSO_4.1/2H_2O + 3/2H_2O$.

Typical gypsum-based construction products can be made by mixing the calcined gypsum with water and permitting it to set by allowing the calcium sulfate hemihydrate to react with water to convert the hemihydrate into a matrix of interlocking calcium sulfate dihydrate crystals. As the matrix forms, the product slurry becomes firm and holds a desired shape. Excess water must then be removed from the product by drying.

Most gypsum-containing board products are prepared by forming a mixture of calcined gypsum (calcium sulfate hemihydrate and/or calcium sulfate anhydrite) and water (and other components, as appropriate), casting the mixture into a desired shaped mold or onto a surface, and allowing the mixture to harden to form set (i.e., rehydrated) gypsum by reaction of the calcined gypsum with the water to form a matrix of crystalline hydrated gypsum (calcium sulfate dihydrate). This is often followed by mild heating to drive off the remaining free (unreacted) water to yield a dry product. It is the desired hydration of the calcined gypsum that enables the formation of an interlocking matrix of set gypsum crystals, thus imparting strength and structure to the gypsum-containing product.

In the absence of additives to prevent it, set gypsum could absorb up to 50% of its weight when immersed in water. Boards or panels that absorb water swell, become deformed and lose strength. This property is undesirable in products that are likely to be exposed to water. In areas such as bathrooms or kitchens, high temperature and humidity are common, and walls are likely to be splashed. In such areas, it is preferable to use a gypsum board that exhibits water-resistance, thus maintaining strength, dimensional stability, and/or health safety.

Many attempts have been made to improve the water-resistance of gypsum products. Various hydrocarbons, including wax, resins and asphalt have been added to the slurry in order to impart water resistance to the set product. The use of siloxanes, which form silicone resins in gypsum products, to impart water resistance is well known.

Although the use of siloxanes in gypsum slurries is a useful means of imparting water-resistant to the finished product, there are drawbacks associated with it. When added to a slurry to form silicone resins in situ, siloxane polymerization can be slow. The siloxane forms a reactive silanol intermediate to yield polymethylsilicic acid, which cross links to form the silicone resin. The reaction proceeds slowly, often continuing after the gypsum is set and requiring one to two weeks to fully develop water-resistance. Wallboard made using this method must be stored for a time sufficient for the water-resistance to develop before the board can be shipped. In some cases, the siloxane may not polymerize within a reasonable time or it may not polymerize fully. In such cases, the water resistance does not develop in the gypsum board to a satisfactory level. Additionally, failure to polymerize fully leads to using a larger dose of the siloxane, increasing the cost of the raw materials.

Catalysts, such as alkaline earth oxides and hydroxides, are known to accelerate the curing reaction of siloxane in a stucco slurry. These catalysts are relatively water soluble and elevate the pH of the slurry. High pH can interfere with the rehydration of the stucco, and can negatively react with some preferred wallboard additives. Thus, while the siloxane polymerization is promoted, other considerations make the use of these catalysts undesirable.

Magnesium oxide ("MgO") is known to catalyze siloxane reactions. However, if catalysis is at a level sufficient to polymerize the siloxane fully, undesirable cracking may result. Light-burned MgO has the activity needed to polymerize siloxane quickly, but the activity leads to unwanted side reactions. These side reactions generate hydrogen, which cause expansion of the product and cracking of set gypsum. Hard-burned or dead-burned MgO has lower reactivity, but results in a less water-resistant product. Thus, when MgO is used alone, it is difficult to balance catalyst activity with the desired extent of siloxane polymerization.

There are also certain gypsum sources for which it is very difficult to drive the polymerization of siloxane. Gypsum is a complex mixture of calcium sulfate in various forms, salts and a variety of aluminates, silicates and aluminosilicates. Apparently some gypsum sources include one or more components that suppress the formation of the silicone resin. When used with these materials, known catalysts fall short of the desired level of water-resistance of less than 5% water absorbance.

More recently, other catalyst compositions have been investigated. For example, U.S. Pat. No. 7,803,226 describes catalyst compositions that include MgO and Class C fly ash. The inclusion of Class C fly ash is described as allowing the use of a broader selection of MgO sources including hard-burned or light-burned MgO.

In another example, US Pat. App. Pub. No. 2018/0118940 discloses waterproof board that is the cured product of an aqueous slurry comprising calcium sulfate hemihydrate, a silicone oil, and a carbonate rock mineral as a catalyst. The carbonate rock examples disclosed are aragonite ($CaCO_3$), calcite ($CaCO_3$), dolomite ($CaMg(CO_3)_2$), and light burned dolomite. In addition, the slurry may further comprise a basic catalyst, examples of which are limestone, slaked lime, Portland cement, MgO, CaO, and CaMgO.

EP1112986 is another example that discloses increasing the water resistance of a gypsum containing material by including a polymerizable siloxane and Portland cement as a catalyst in a slurry.

CN110759693 discloses a water-resistant gypsum board comprising Plaster of Paris, modified starch, silicone oil, a silicone oil catalyst, a foaming agent, water-resistant mask paper, and water. A disclosed example of the silicon oil catalyst is 325-mesh cement, heavy calcium oxide, heavy magnesium oxide, dolomite high-temperature calcination product, or a mixture thereof.

While the above-described catalysts may be suitable for siloxane polymerization to impart water-resistant properties to a gypsum product, the supply and/or quality of many are variable. Therefore, there remains a desire for new catalysts useful in preparing water-resistant gypsum products.

SUMMARY

The present disclosure relates to compositions and methods relating to water-resistant gypsum products, typically water-resistant gypsum panels, that are produced using a novel catalyst that includes calcium aluminate cement and/or calcium sulfoaluminate cement.

The present invention provides a gypsum panel having a core comprising:
  interwoven matrices of calcium sulfate dihydrate crystals and a silicone resin, wherein the interwoven matrices have dispersed throughout them a siloxane polymerization catalyst comprising:
    (a) 55 wt % to 100 wt % calcium aluminate cement and/or calcium aluminate cement and
    (b) 0 wt % to 45 wt % and magnesium oxide;
  wherein the weight ratio of the siloxane polymerization catalyst to the calcium sulfate dihydrate is 0.01-5:100, wherein the gypsum panel comprises at least 50 wt. % calcium sulfate dihydrate, preferably at least 80 wt. % calcium sulfate dihydrate. The gypsum panel may have an absence of one or more of fly ash, Portland cement, limestone, aragonite, calcite, dolomite, and slaked lime. Preferably the gypsum panel has an absence of fly ash. Preferably the gypsum panel has an absence of Portland cement. The gypsum panel may have an absence of magnesium oxide. The gypsum panel may have an absence of magnesium hydroxide.

In its method respects, the present invention provides a method for producing the gypsum panel comprising:
  making a siloxane emulsion with siloxane and water;
  mixing a siloxane polymerization catalyst comprising (a) 55 wt % to 100 wt % calcium aluminate cement and/or calcium aluminate cement and (b) 0 wt % to 45 wt % and magnesium oxide with calcium sulfate hemihydrate to form a siloxane polymerization catalyst/calcium sulfate hemihydrate mixture, wherein the weight ratio of the siloxane polymerization catalyst to the calcium sulfate hemihydrate is 0.01-5:100;
  combining the siloxane emulsion with the siloxane polymerization catalyst/calcium sulfate hemihydrate mixture to prepare an aqueous gypsum slurry comprising at least 50 wt. % calcium sulfate hemihydrate on a water free (dry) basis, preferably at least 80 wt. % calcium sulfate hemihydrate on a water free basis;
  shaping the aqueous gypsum slurry and allowing the aqueous gypsum slurry to set to form a set core of the gypsum panel; and
  allowing the siloxane polymerization catalyst to polymerize the siloxane partially or fully. The resultant gypsum panel may have a composition according to the foregoing non-limiting example of a water-resistant gypsum panel. The aqueous gypsum slurry may have an absence of one or more of fly ash, Portland cement, limestone, aragonite, calcite, dolomite, and slaked lime. Preferably the aqueous gypsum slurry has an absence of Portland cement. The aqueous gypsum slurry may have an absence of magnesium oxide. The aqueous gypsum slurry may have an absence of magnesium hydroxide.

A siloxane polymerization process comprises mixing a siloxane with or without catalyst in the presence of water and allowing the siloxane to cross link and condense to form the silicone resin. The addition of the present siloxane polymerization catalyst makes the siloxane polymerization take place faster.

The present invention also provides an aqueous gypsum slurry composition comprising:
  at least 50 wt. % calcium sulfate hemihydrate on a water free basis, preferably at least 80 wt. % calcium sulfate hemihydrate on a water free basis;
  a siloxane polymerization catalyst comprising (a) 55 wt % to 100 wt % calcium aluminate cement and/or calcium aluminate cement and (b) 0 wt % to 45 wt % and magnesium oxide, wherein the weight ratio of the siloxane polymerization catalyst to the calcium sulfate hemihydrate is 0.01-5:100; and
  a siloxane emulsion with siloxane and water. The aqueous gypsum slurry may have an absence of one or more of fly ash Portland cement, limestone, aragonite, calcite, dolomite, and slaked lime. Preferably the aqueous gypsum slurry has an absence of fly ash. Preferably the aqueous gypsum slurry has an absence of Portland cement. The aqueous gypsum slurry may have an absence of magnesium oxide. The aqueous gypsum slurry may have an absence of magnesium hydroxide.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

The present disclosure relates to compositions and methods relating to water-resistant gypsum products. More specifically, the present disclosure uses a novel catalyst that includes calcium aluminate cement and/or calcium sulfoaluminate cement. The catalyst promotes the polymerization of the siloxane to form a highly crosslinked silicone resin.

The gypsum products of the present disclosure may be produced from slurries according to Table 1. The resultant gypsum products may have a composition according to Table 2.

TABLE 1

Example Slurry Composition (parts by weight)

| Component | Broad Range | Preferred Range | More Preferred Range |
|---|---|---|---|
| Calcium Sulfate Hemihydrate (stucco) | 100 | 100 | 100 |
| Catalyst | 0.01-5 | 0.1-5 | 0.3-3 |
| Siloxane | 0.2-2 | 0.2-1.5 | 0.2-1.2 |
| Accelerator | 0.1-5 | 0.5-3.5 | 0.5-2 |
| Starch | 0-2 | 0-2 | 0.5-1.5 |
| Set Retarder | 0-2 | 0-1 | 0-0.5 |
| Dispersant | 0.1-2 | 0.1-1 | 0.1-0.5 |
| Filler | 0-5 | 0-4 | 0-3 |
| Other Additives (independently) | 0-2 | 0-2 | 0-2 |
| Water | 50-150 | 75-125 | 80-110 |

TABLE 2

Example Set Product Composition (parts by weight)

| Component | Broad Range | Preferred Range | More Preferred Range |
|---|---|---|---|
| Calcium Sulfate Dihydrate (gypsum) | 100 | 100 | 100 |
| Catalyst | 0.01-5 | 0.1-5 | 0.3-3 |
| Silicone Resin (at least partially polymerized siloxane) | 0.2-2 | 0.2-1.5 | 0.2-1.2 |
| Accelerator | 0.1-5 | 0.5-3.5 | 0.5-2 |
| Starch | 0-2 | 0-2 | 0-1 |
| Set Retarder | 0-2 | 0-1 | 0.01-0.5 |
| Dispersant | 0.1-2 | 0.1-1 | 0.1-0.5 |
| Filler | 0-5 | 0-4 | 0-3 |
| Other Additives (independently) | 0-2 | 0-2 | 0-2 |

The invention provides a water-resistant gypsum panel by including silicone resin in the gypsum panel in an effective amount to improve the water-resistance of the panel compared to a gypsum panel of the same composition but not including the silicone resin.

Without being limited by theory, it is believed that water resistance develops when the siloxane cures (polymerizes) within the formed gypsum product (e.g., wallboard) to make the silicone resin. The siloxane polymerization reaction proceeds slowly on its own, requiring that the gypsum product be stored for a time sufficient to develop water-resistance prior to shipping. Siloxane polymerization catalysts are known to accelerate the polymerization reaction, thereby reducing or eliminating the time needed to store gypsum product as the water-resistance develops. Preferably the invention catalyzes siloxane polymerization with an absence of fly ash. Preferably the invention catalyzes siloxane polymerization with an absence of Portland cement.

The invention may catalyze siloxane polymerization with an absence of low-alkali cement. The invention may catalyze siloxane polymerization with an absence of any cement except calcium aluminate cement and/or calcium sulfoaluminate cement. The invention may catalyze siloxane polymerization with an absence of magnesium oxide. The invention may catalyze siloxane polymerization with an absence of magnesium hydroxide. The invention may catalyze siloxane polymerization with an absence of calcium silicate hydrate other than any incidentally resulting from use of calcium aluminate cement and/or calcium sulfoaluminate.

Gypsum Board and Method of Preparing

Figure 1:
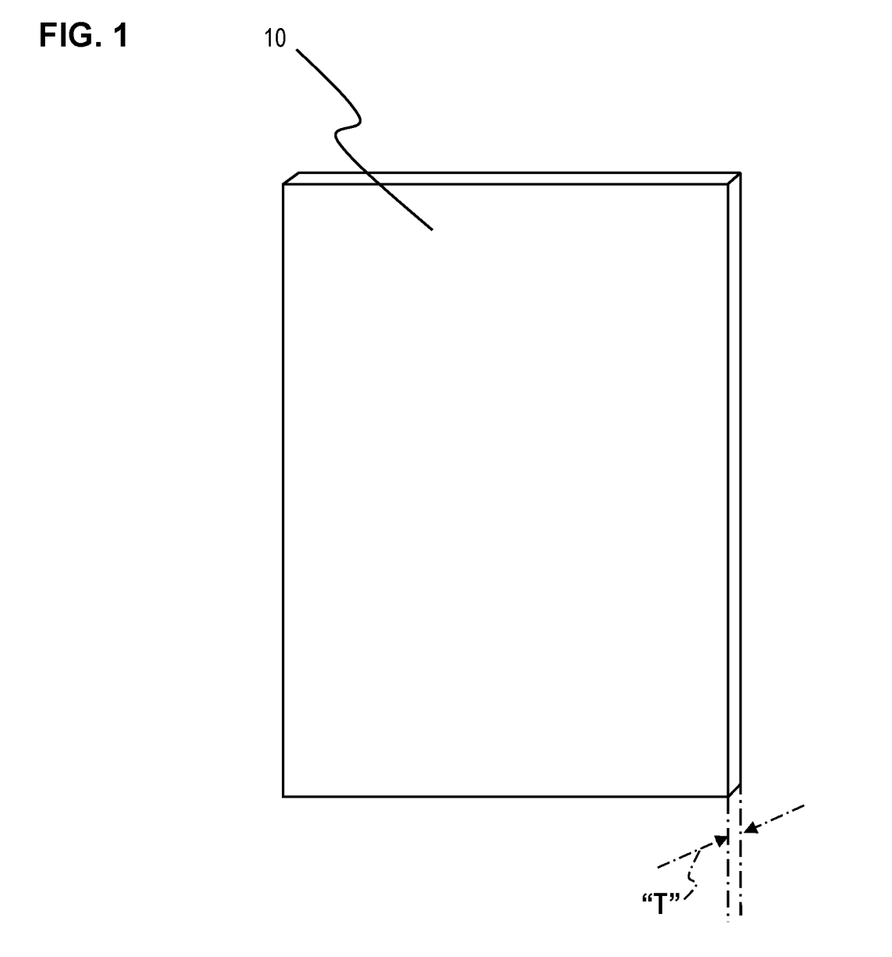
FIG. 1 shows a perspective view of a board of the present invention.
Figure 2:
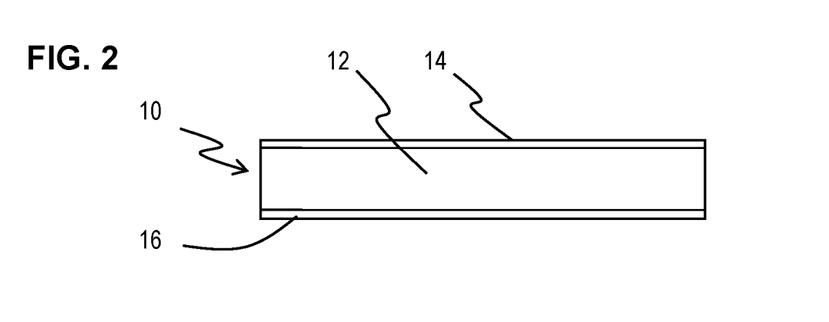
FIG. 2 shows a top view of a board of the present invention.

In a process for manufacturing gypsum-based structures, such as gypsum board (gypsum panels) 10 (see FIG. 1) comprising a core of set gypsum-containing material, a metered amount of water (called "gauging water") and any other liquid components are continuously fed into a slurry mixer. The mixer can be a "pin mixer" or a "pinless mixer" as one skilled in the art would understand. Panel 10 also has a gypsum core 12, front facer sheet, 14, and back facer sheet 16 as seen in FIG. 2. The calcined gypsum and the other dry ingredients used to make the wallboard are usually dry blended and then are continuously fed to the mixer where they are mixed with the gauging water for a few seconds to form an aqueous slurry. Foam used to reduce the wallboard density may also be added to the mixer. The slurry formed in the mixer is then shaped into the article, such as the wall board and then the shaped article is dried.

In order to obtain the best water resistance, the process uniformly distributes the siloxane in the gypsum slurry. The siloxane may be mixed with water to form a siloxane emulsion and then the siloxane emulsion may be added into the mixer. Because a relatively small amount of siloxane is used, it has been found that the most uniform distribution of the siloxane is provided when the siloxane, in the form of an emulsion, is mixed with the gauging water. This uniformly distributes the siloxane throughout the gauging water used to form the gypsum slurry. The gauging water, premixed with the siloxane, is mixed with the gypsum and other dry materials in the slurry mixer to form the slurry. However, the siloxane can also be directly added into the mixer.

In manufacture of this gypsum board, the present invention uses calcium aluminate cement and/or calcium sulfoaluminate cement as the siloxane polymerization catalyst to polymerize the siloxanes to impart water-resistance properties to the gypsum panels. More specifically, the catalyst of the present invention comprises 55-100 wt % calcium aluminate cement, 0-45 wt % and MgO and no fly ash. Generally the board 10 (FIG.) has a thickness T of 0.25 to 1 inch.

In other respects, the composition and method can be practiced with the same components and in the same manner as the corresponding compositions and methods for preparing mold resistant panels, glass-mat gypsum panels such as those disclosed by U.S. Pat. Nos. 6,893,752 and 7,892,472, both to Veeramasuneni et al, as well as U.S. Pat. No. 7,803,226 to Wang et al., or water resistant panels as disclosed by U.S. Pat. No. 8,070,895 to Engbrecht et al. For instance, Col. 4 of U.S. Pat. No. 8,070,895 to Engbrecht et al. discloses additives commonly used to produce cementitious articles, such as gypsum board or cement board include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. For instance, other aspects of preparing an aqueous siloxane emulsion and combining the emulsion with a cementitious slurry are as described in U.S. Pat. No. 7,803,226 to Wang et al., herein incorporated by reference. For instance, Col. 8 U.S. Pat. No. 7,803,226 to Wang et al., discloses known additives may be used as needed to modify specific properties of the product. Sugars, such as dextrose, are used to improve the paper bond at the ends of the boards. Wax emulsions or siloxanes are used for water resistance. If stiffness is needed, boric acid is commonly added. Fire retardancy can be improved by the addition of vermiculite. These and other known additives are useful in the present slurry and wallboard formulations. Glass fibers are optionally added to the slurry in amounts of up to 11 lb./MSF (54 g/m$^2$). Up to 15 lb./MSF (73.2 g/m$^2$)°f paper fibers are also added to the slurry. Wax emulsions are added to the gypsum slurry in amounts up to 90 lb./MSF (0.439 kg/m$^2$) to improve the water-resistency of the finished gypsum board panel.

Briefly, a method for preparing a gypsum panel, e.g. wallboard, may include mixing an aqueous gypsum slurry described herein (e.g., according to Table 1). This includes moving the powdered stucco toward a slurry mixer. Prior to entry into the slurry mixer, dry additives (e.g., starches, set accelerators, and the like) are added to the powdered stucco. Some additives may be added directly to the mixer via a separate line. For most additives, there is no criticality regarding placing the additives in the slurry, and said additives may be added using whatever equipment or method is convenient.

A silicone polymerization catalyst comprising (a) calcium aluminate cement and/or calcium sulfoaluminate cement and (b) optionally MgO, which promotes the polymerization of the silicone to form a highly crosslinked silicone resin is also added to the gypsum slurry. The silicone polymerization catalyst is added typically with the dry ingredients fed to the slurry mixer. The silicone polymerization catalyst may alternatively be added directly to the mixer via a separate line.

Then, the polymerizable siloxane is added to the aqueous gypsum slurry. Preferably the siloxane is added in the form of an emulsion or stable suspension. The siloxane emulsion is preferably added to the gauging water before adding the gauging water to the slurry to provide sufficient time for the siloxane emulsion to thoroughly mix with water used to form the slurry.

Then the aqueous gypsum slurry is optionally foamed to decrease the product density. Foam is generated by combining foaming agent and water. The foam may be injected into the moving slurry after it exits from the mixer through a hose or chute. Other methods of injecting foam into the slurry may be used, as one skilled in the art may appreciate. When the foam and the slurry have been brought together, the resulting foamed slurry (or just the slurry if foaming is not performed) moves toward and is poured onto a conveyor lined with the first sheet of facing material. Another sheet of facing material is placed on top of the slurry, forming a sandwich with the gypsum slurry between the two facing materials. Thus, the method of preparing the gypsum board comprises contacting the gypsum slurry with the first and second facer sheets, wherein the gypsum slurry is disposed between the first facer sheet and the second facer sheet. The invention encompasses making the gypsum board with paper facer sheets on front and/or back faces of the board. In the alternative, the invention also encompasses making the gypsum board with fibrous mat facer sheets on the front and/or back faces of the board. Non-limiting examples of suitable fibers include glass fibers, polyamide fibers, polyaramid fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and the like, as well as combinations thereof.

The gypsum slurry is then shaped and dried on the facing material into a panel under conditions that promote the polymerization of the siloxane to form the highly cross-linked silicone resin and allow the gypsum slurry to set, thereby forming a core of the wallboard; and polymerizing the siloxane. For instance, the sandwich is fed to a forming plate, the height of which determines the thickness of the board. Next the continuous sandwich is cut into appropriate lengths at the cutting knife, usually eight feet to twelve feet, to yield boards. Then boards are moved to a kiln for drying. Temperatures in the kiln typically range from 450° F. to 550° F., but other temperatures may be used depending on manufacturing conditions as one skilled in the art would appreciate.

The gypsum products described herein may be water-resistant gypsum-based wall board and ceiling board products, e.g., gypsum boards, reinforced gypsum composite boards, or fibrous mat-faced gypsum boards.

When the slurry sets, the core may include interwoven matrices of calcium sulfate dihydrate crystals and a silicone resin, where the interwoven matrices have dispersed throughout them the catalyst comprising (a) the cement selected from calcium aluminate cement and/or calcium sulfoaluminate cement and (b) magnesium oxide, preferably with an absence of fly ash.

The gypsum products described herein may have a water absorption according to ASTM C1396/C1396M-17, Standard Specification for Gypsum Board, of 10 wt. % or less, or 5 wt. % or less. Typically glass mat gypsum panels have a water absorption according to ASTM C1396/C1396M-17 of wt. % is 10 wt. % or less. Typically gypsum panels have a water absorption according to ASTM C1396/C1396M-17 of wt. % is 5 wt. % or less.

While not wishing to be bound by theory, it is believed that water resistance develops when the siloxane cures within the set gypsum product. The polymerization reaction proceeds slowly on its own, requiring the gypsum product to be stored for sufficient time to develop water resistance prior to shipping. The present catalyst reduces this time.

Calcium Sulfate

Although calcium sulfate, e.g., calcium sulfate hemihydrate, is a hydraulic component because it will react with water, it is not considered to be hydraulic cement for purposes of this disclosure. Calcined gypsum, also known as calcium sulfate hemihydrate or stucco, for use in the gypsum slurries used to make products of the invention typically contains beta calcium sulfate hemihydrate from natural or synthetic sources. The calcined gypsum may also contain minor amounts of calcium sulfate anhydrite. The term gypsum slurry encompasses the aqueous slurries with water and calcined gypsum (typically calcium sulfate hemihydrate) prior to its setting and as the calcined gypsum sets to form set gypsum (calcium sulfate dihydrate).

The calcium sulfate hemihydrate is at least 50 wt. %, preferably at least 80 wt. %, of the ingredients used to make the gypsum product, e.g., gypsum board, on a dry (water free) basis. In many gypsum board formulations, calcium sulfate hemihydrate is at least 90 wt. % or at least 95 wt. % of the ingredients used to make the gypsum product, e.g., gypsum board, on a dry (water free) basis. Thus, the calcium sulfate hemihydrate is at least 50 wt. %, preferably at least 80 wt. %, of the ingredients in the aqueous gypsum slurry used to make the gypsum product, e.g., gypsum board, on a dry (water free) basis. In many gypsum board formulations, calcium sulfate hemihydrate is at least 90 wt. % or at least 95 wt. % of the ingredients used to make the gypsum product, e.g., gypsum board, on a dry (water free) basis. The method of calcination is not important, and either alpha or beta-calcined stucco is suitable. Typically alpha calcium sulfate hemihydrate is employed for its yield of set gypsum having relatively high strength. However, beta calcium sulfate hemihydrate or a mixture of beta calcium sulfate hemihydrate and water-soluble calcium sulfate anhydrite may be employed. Use of calcium sulfate anhydrite is also contemplated as an ingredient used to make the gypsum product. However, calcium sulfate anhydrite is preferably used in small amounts of less than 20 wt. % of the ingredients used to make the gypsum product.

The set calcium sulfate dihydrate is at least 50 wt. %, preferably at least 80 wt. %, typically at least 90 wt. % or at least 95 wt. % of the gypsum board product.

Siloxane

Preferably, the siloxane is generally a fluid linear hydrogen-modified siloxane, but it can also be a cyclic hydrogen-modified siloxane. Such siloxanes are capable of forming highly crosslinked silicone resins. Such fluids are well known to those of ordinary skill in the art and are commercially available and are described in the patent literature. Typically, the linear hydrogen modified siloxanes useful in the practice of the present disclosure comprise those having a repeating unit of the general formula (I):

(I)

wherein R represents a saturated or unsaturated mono-valent hydrocarbon radical. In the preferred embodiments, R represents an alkyl group and most preferably R is a methyl group. During polymerization, the terminal groups are removed by condensation and siloxane groups are linked together to form the silicone resin. Crosslinking of the chains also occurs. The resulting silicone resin imparts water resistance to the gypsum matrix as it forms.

The siloxane may be formed into an emulsion or a stable suspension with water as discussed above. A number of siloxane emulsions are contemplated for use in this slurry. The gypsum products of the present disclosure are preferably made with a solventless methyl hydrogen siloxane fluid.

Emulsions of siloxane in water are also available for purchase, but the emulsion may include emulsifying agents that tend to modify properties of the gypsum products, such as the paper bond in wallboard products. Emulsions or stable suspensions prepared without the use of emulsifiers are therefore preferred. Preferably, a suspension is formed in situ by mixing the siloxane fluid with water as discussed above. The siloxane suspension should be stable until it reaches the mixer and should remain well dispersed under the conditions of the slurry and in the presence of the optional additives. That is, the siloxane suspension or emulsion should remain stable through the steps in which the slurry and gypsum products described herein are formed. Preferably, the siloxane suspension or emulsion remains stable for more than 40 minutes. More preferably, the siloxane suspension or emulsion remains stable for at least one hour. The term "emulsion" is intended to include true emulsions and suspensions that are stable at least until the stucco is 50% set.

In a non-limiting example embodiment for producing gypsum products, at least a portion of the gauging water is continuously fed to a high shear mixer (not the slurry mixer) to form the siloxane emulsion. Preferably this portion of the gauging water is continuously fed to a high speed mixer and the two components may be mixed from a few seconds to a few minutes until a stable emulsion is formed. The siloxane fluid may be metered into the high shear mixer with the water to form the emulsion in about 1 to 2 seconds. The proportion of water to siloxane is not critical, and a mixture of 25 parts water to one part siloxane is known to be useful. This emulsion is stable for several minutes without the addition of an emulsifier, which should be long enough to mix the slurry, form the article, and allow it to start to set. From the high shear mixer, the emulsion may be added directly to the slurry mixer where the emulsion is combined with the remainder of the gauging water.

In an alternative method, use of a portion of the gauging water to form the emulsion is also contemplated. A slip stream of the gauging water may be combined with the siloxane in the high shear mixer. The siloxane emulsion may then preferably be added to the gauging water before the slurry is formed to provide sufficient time for the siloxane emulsion to thoroughly mix with water used to form the slurry and be uniformly dispersed throughout the resulting articles. This facilitates keeping the siloxane emulsion stable until it reaches the slurry mixer and keeping the siloxane emulsion stable through the steps in which the gypsum based articles are formed as well. This also facilitates keeping the siloxane emulsion well dispersed under the conditions of the slurry in the presence of the slurry additives, such as accelerators.

Siloxane Polymerization Catalyst

Siloxane polymerization catalysts of the present disclosure may comprise (a) 55 wt % to 100 wt % calcium aluminate cement and/or calcium sulfoaluminate cement and (b) 0 wt % to 45 wt % MgO, or (a) 65 wt % to 95 wt % calcium aluminate cement and/or calcium sulfoaluminate cement and (b) 5 wt % to 35 wt % MgO, or (a) 70 wt % to 90 wt % calcium aluminate cement and/or calcium sulfoaluminate cement and (b) 10 wt % to 30 wt % MgO, or (a) 100 wt % calcium aluminate cement and/or calcium sulfoaluminate cement. Thus for example, for 100 parts by weight siloxane catalyst, if the catalyst comprises 90 wt % calcium aluminate cement and/or calcium sulfoaluminate cement and 10 wt % MgO, then the catalyst has (a) 90 parts by weight calcium aluminate cement and/or calcium sulfoaluminate cement and (b) 10 parts by weight MgO.

Siloxane polymerization catalysts of the present disclosure may consist essentially of (a) 55 wt % to 100 wt % calcium aluminate cement and/or calcium sulfoaluminate cement and (b) 0 wt % to 45 wt % MgO, or (a) 65 wt % to 95 wt % calcium aluminate cement and/or calcium sulfoaluminate cement and (b) 5 wt % to 35 wt % MgO, or (a) 70 wt % to 90 wt % calcium aluminate cement and/or calcium sulfoaluminate cement and (b) 10 wt % to 30 wt % MgO, or (a) 100 wt % calcium aluminate cement and/or calcium sulfoaluminate cement.

Siloxane polymerization catalysts of the present disclosure may consist of (a) 55 wt % to 100 wt % calcium aluminate cement and/or calcium sulfoaluminate cement and (b) 0 wt % to 45 wt % MgO, or (a) 65 wt % to 95 wt % calcium aluminate cement and/or calcium sulfoaluminate cement and (b) 5 wt % to 35 wt % MgO, or (a) 70 wt % to 90 wt % calcium aluminate cement and/or calcium sulfoaluminate cement and (b) 10 wt % to 30 wt % MgO, or (a) 100 wt % calcium aluminate cement and/or calcium sulfoaluminate cement.

Catalyst of the present disclosure may be free (i.e., comprise 0 wt %) of one or more of: Portland cement, fly ash, limestone ($CaCO_3$), aragonite ($CaCO_3$), calcite ($CaCO_3$), dolomite ($CaMg(CO_3)_2$), and slaked lime ($Ca(OH)_2$). Catalyst of the present disclosure may be free of all of: Portland cement, fly ash, limestone ($CaCO_3$), aragonite ($CaCO_3$), calcite ($CaCO_3$), dolomite ($CaMg(CO_3)_2$), and slaked lime ($Ca(OH)_2$).

In preferred embodiments, there is no other calcium aluminate cement and/or calcium sulfoaluminate cement in the methods, compositions, and products of the invention except that provided as the catalyst.

Per 100 parts by weight total calcium aluminate cement and/or calcium sulfoaluminate, the weight ratio of calcium aluminate cement to calcium sulfoaluminate cement may range from 0:100 to 100:0, typically 10:90 to 90:10, or typically 30:70 to 70:30. If desired, calcium aluminate cement may be used in the absence of calcium sulfoaluminate cement. If desired, calcium sulfoaluminate cement may be used in the absence of calcium aluminate cement.

Preferably the methods, compositions and products of the invention are free of fly ash. Typically the methods, compositions and products of the invention are free of Portland cement.

Calcium Aluminate Cement

Calcium aluminate cement (CAC) is a hydraulic cement. Calcium aluminate cement is also commonly referred to as aluminous cement or high alumina cement.

As used herein, "calcium aluminate cement" refers to a cement that comprises at least 30 wt % (e.g., 30 wt % to 85 wt %) $Al_2O_3$. Calcium aluminate cements preferably have an alumina content of about 30-80 wt %. Higher purity calcium aluminate cements have alumina content that can range as high as about 80 wt %, but these higher purity calcium aluminate cements tend to be relatively more expensive. Monocalcium aluminate or dodecacalcium hepta-aluminate ($12CaO \cdot 7Al_2O_3$, $Ca12Al14O33$ or C12A7) reacts with water to yield calcium aluminate hydrates.

Several calcium aluminate compounds are formed during the manufacturing process of calcium aluminate cements. The predominant compound formed is above-mentioned monocalcium aluminate ($CaO \cdot Al_2O_3$, also referred to as CA), in one type of calcium aluminate cement. In another type of calcium aluminate cement, $12CaO \cdot 7Al_2O_3$ also referred to as C12A7 or dodecacalcium hepta-aluminate is formed as the primary calcium aluminate reactive phase. The other calcium aluminate and calcium silicate compounds that are formed in the production of calcium aluminate cements include $CaO \cdot 2Al_2O_3$ also referred as CA2 or calcium dialuminate, dicalcium silicate ($2CaO \cdot SiO_2$, called C2S), dicalcium alumina silicate ($2CaO \cdot Al_2O_3 \cdot SiO_2$, called C2AS). Several other compounds containing relatively high proportion of iron oxides are also formed. These include calcium ferrites such as $CaO \cdot Fe_2O_3$ or CF and $2CaO \cdot Fe_2O_3$ or C2F, and calcium alumino-ferrites such as tetracalcium aluminoferrite ($4CaO \cdot Al_2O_3 \cdot Fe_2O_3$ or C4AF), $6CaO \cdot Al_2O_3 \cdot 2Fe_2O_3$ or C6AF2) and $6CaO \cdot 2Al_2O_3 \cdot Fe_2O_3$ or C6A2F). Other minor constituents present in the calcium aluminate cement include magnesia (MgO), titania ($TiO_2$), sulfates and alkalis. The preferred calcium aluminate cements useful of some embodiments of the invention can have one or more of the aforementioned phases. Calcium aluminate cements having monocalcium aluminate ($CaO \cdot Al_2O_3$ or CA) and/or dodecacalcium hepta-aluminate ($12CaO \cdot 7Al_2O_3$ or C12A7) as predominant phases are particularly preferred of some embodiments of the present invention. Further, the calcium aluminate phases can be available in crystalline form and/or amorphous form. CIMENT FONDU® (or HAC Fondu), SECAR® 51, and SECAR® 71 are some examples of commercially available calcium aluminate cements that have the monocalcium aluminate (CA) as the primary cement phase. TERNAL® EV is an example of commercially available calcium aluminate cement that has the dodecacalcium hepta-aluminate ($12CaO \cdot 7Al_2O_3$ or C12A7) as the predominant cement phase.

The surface area of a typical calcium aluminate cement that is useful in the invention is greater than about 3,000 $cm^2$/gram, for example about 4,000 to 6,000 $cm^2$/gram as measured by the Blaine surface area method (ASTM C 204).

Examples of calcium aluminate cement compositions are provided in Table 3 where other components may be present in impurity level concentrations (e.g., less than 0.5 wt %).

TABLE 3

Example Calcium Aluminate Cement Compositions (wt %)

| Calcium Aluminate Cement | $SiO_2$ | $Al_2O_3$ | $Fe_2O_3$ | CaO | MgO | $TiO_2$ |
|---|---|---|---|---|---|---|
| General Purpose | 4 | 39 | 16 | 38 | 1 | 2 |
| Buff | 5 | 53 | 2 | 38 | 0.1 | 2 |
| White | 3 | 62 | 0.4 | 34 | 0.1 | 0.4 |
| Refractory | 0.4 | 80 | 0 | 20 | 0 | 0.1 |

In the above examples, monocalcium aluminate ($CaO \cdot Al_2O_3$) makes up 46 wt % of the general purpose composition, 70 wt % of the buff composition, 70 wt % of the white composition, and 35 wt % of the refractory composition.

Examples of commercially available calcium aluminate cements include, but are not limited to, TERNAL® EV (calcium aluminate cement, available from Kerneos), and SECAR® 71 (calcium aluminate cement, available from Kerneos).

If calcium sulfoaluminate cement is employed then compositions and methods of the present invention may have an absence of calcium aluminate cement.

Calcium Sulfoaluminate Cement

Calcium sulfoaluminate cement (CSA) is a hydraulic cement. As used herein, "calcium sulfoaluminate cement" refers to cement that has a mineralogical composition comprising anhydrous calcium sulfoaluminate ($4CaO \cdot 3Al_2O_3 \cdot CaSO_4$) as a major component (e.g., at 50 wt % or more, or at 50 wt % to 80 wt %) and may comprise minor components of dicalcium silicate ($2CaO \cdot SiO_2$), gypsum ($CaSO_4 \cdot 2H_2O$), and aluminoferrite ($4CaO \cdot Al_2O_3 \cdot Fe_2O_3$).

CSA are a different class of cements from calcium aluminate cement or calcium silicate based hydraulic cements, for example, Portland cement. CSA are hydraulic cements based on calcium sulphoaluminate, rather than calcium aluminates which are the basis of CAC cement or calcium silicates which are the basis of Portland cement. Calcium sulfoaluminate cements are made from clinkers that include Ye'elimite ($Ca_4(AlO_2)_6SO_4$ or C4A3S) as a primary phase. Other major phases present in the calcium sulfoaluminate cements may include one or more of the following: dicalcium silicate (C2S), tetracalcium aluminoferrite (C4AF), and calcium sulfate (CS). The relatively low lime requirement of calcium sulfoaluminate cements compared to Portland cement reduces energy consumption and emission of greenhouse gases from cement production. In fact, calcium sulfoaluminate cements can be manufactured at temperatures approximately 200° C. lower than Portland cement, thus further reducing energy and greenhouse gas emissions.

The amount of Ye'elimite phase present in the calcium sulfoaluminate cements useful in some embodiments of this invention is preferably about 20 to about 90 wt % and more preferably 30 to 75 wt %. When calcium sulfoaluminate cements are used in the present invention, they may partially substitute calcium aluminate cement. The amount of calcium sulfoaluminate cement substitution in the composition of some embodiments of the invention can be up to about 49 wt % of the aggregated weight of calcium aluminate cement and calcium sulfoaluminate cement.

Examples of calcium sulfoaluminate cement compositions are provided in Table 4 where other components may be present in impurity level concentrations (e.g., less than 0.5 wt %).

TABLE 4

Example Calcium Sulfoaluminate Cement Compositions (wt %)

| Calcium Sulfoaluminate Cement | $SiO_2$ | $Al_2O_3$ | $Fe_2O_3$ | CaO | MgO | $SO_3$ |
|---|---|---|---|---|---|---|
| Ex. 1 | 8 | 35 | 2 | 41 | 0 | 16 |

In the above example, calcium sulfoaluminate ($4CaO \cdot 3Al_2O_3 \cdot CaSO_4$) makes up 60 wt % of the cement.

Examples of commercially available calcium sulfoaluminate cements include, but are not limited to, FASTROCK 500 (calcium sulfoaluminate cement, available from Kerneos) and RAPID SET® (calcium sulfoaluminate cement, available from CTS Cement Manufacturing Corporation).

If calcium aluminate cement is employed then compositions and methods of the present invention may have an absence of calcium sulfoaluminate cement.

Portland Cement

As opposed to the calcium aluminate cement and the calcium sulfoaluminate cement, "Portland cement" is another class of hydraulic cement. As used herein, "Portland cement" is a calcium silicate based hydraulic cement. "Portland cement" refers to a cement that has a mineralogical composition with four chief components: tricalcium silicate ($3CaO \cdot SiO_2$), dicalcium silicate ($2CaO \cdot SiO_2$), tricalcium aluminate ($3CaO \cdot Al_2O_3$), and tetracalcium aluminoferrite ($4CaO \cdot Al_nFe_{2-n}O_3$). The mineralogical composition of Portland cement includes less than 5 wt % (e.g., 0 wt % to 5 wt %, preferably 0 wt % to 1 wt %) monocalcium aluminate. ASTM C150/C150M-20 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." This ASTM C150/C150M-20 specification covers eight types of Portland cement: type I, type IA, type II, type IIA, type III, type IIIA, type IV, and type V. The cement covered by this specification shall only contain the following ingredients: Portland cement clinker; water or calcium sulfate, or both; limestone; processing additions; and air-entraining addition for air-entraining Portland cement. Portland cement of each of the eight types has the following chemical compositions: aluminum oxide, ferric oxide, magnesium oxide, sulfur trioxide, tricalcium silicate, dicalcium silicate, tricalcium aluminate, and tetracalcium aluminofernite. As used herein, "clinkers" are nodules (diameters, about 0.2-about 1.0 inch [5-25 mm]) of a sintered material that are produced when a raw mixture of predetermined composition is heated to high temperature. ASTM C150/C150M-20 defines the various property and chemical composition requirements of different Portland cement types. Examples of Portland cement compositions are provided in Table 5 where other components may be present in impurity level concentrations (e.g., less than 0.5 wt %). Compositions and methods of the present invention may have an absence of calcium fluoroaluminate cement.

TABLE 5

Example Portland Cement Compositions (wt %)

| Portland Cement | $SiO_2$ | $Al_2O_3$ | $Fe_2O_3$ | CaO | MgO | $SO_3$ |
|---|---|---|---|---|---|---|
| Type I | 21 | 5 | 2 | 64 | 3 | 3 |
| Type II | 22 | 5 | 4 | 64 | 3 | 2 |
| Type III | 21 | 5 | 2 | 65 | 3 | 3 |
| Type IV | 24 | 4 | 4 | 62 | 2 | 2 |
| Type V | 25 | 3 | 3 | 64 | 2 | 2 |

Fly Ash

As used herein, "fly ash" refers to a coal combustion product that is driven out of coal-fired boilers together with flue gases. ASTM C618-19 defines the various property and chemical composition requirements of different fly ash classes. For example, Class F fly ash requires a minimum of 70 wt % being a combination of $SiO_2$, $Al_2O_3$, and $Fe_2O_3$, and Class C fly ash requires a minimum of 50 wt % being a combination of $SiO_2$, $Al_2O_3$, and $Fe_2O_3$. Examples of fly ash compositions are provided in Table 6 where other components may be present in impurity level concentrations (e.g., less than 0.5 wt %).

TABLE 6

Example Fly Ash Compositions (wt %)

| Fly Ash | $SiO_2$ | $Al_2O_3$ | $Fe_2O_3$ | CaO | MgO | $SO_3$ |
|---|---|---|---|---|---|---|
| Class F | 55 | 26 | 7 | 9 | 2 | 1 |
| Class C | 40 | 17 | 6 | 24 | 5 | 3 |

Calcium Fluoroaluminate Cement

As opposed to the calcium aluminate cement and the calcium sulfoaluminate cement, "calcium fluroaluminate cement" is another class of hydraulic cement. As used herein, Calcium fluoroaluminate cement has the chemical formula $3CaO \cdot 3Al_2O_3 \cdot CaF_2$. The calcium fluoroaluminate cement is often produced by first mixing lime, bauxite and fluorspar in such an amount that the mineral of the resulting product becomes $3CaO \cdot 3Al_2O_3 \cdot CaF_2$ and then burning the resulting mixture at a temperature of about 1,200-1,400° C. Compositions and methods of the present invention may have an absence of calcium fluoroaluminate cement.

Magnesium Oxide

Regarding the magnesium oxide that may be included in the catalyst compositions, there are at least three grades of magnesium oxide on the market, depending on the calcination temperature. "Dead-burned" magnesium oxide is calcined between 1500° C. and 2000° C. Use of dead-burned magnesium oxide for siloxane polymerization is described in U.S. Pat. No. 7,892,472 to Veeramasuneni et al., herein incorporated by reference. Dead-burned magnesium oxide is water-insoluble and interacts less with other components of the slurry. Dead-burned magnesium oxide accelerates curing of the siloxane and, in some cases, causes the siloxane to cure more completely. Dead-burned magnesium oxide is commercially available with a consistent composition.

MAGCHEM® P98-PV (available from Martin Marietta Magnesia Specialties) is an example of a dead burned magnesium oxide.

"Hard-burned" magnesium oxide (also known as magnesia) is calcined at temperatures from 1000° C. to about 1500° C. It has a narrow range of reactivity, a high density, and is normally used in application where slow degradation or chemical reactivity is required, such as in animal feed and fertilizer. BAYMAG® 96 (available from Baymag, Inc.) and MAGCHEM® 10 (available from Martin Marietta Magnesia Specialties) are examples of hard-burned magnesia. A particularly preferred source of dead-burned magnesium oxide is BAYMAG® 96. BAYMAG® 96 has a surface area of at least 0.3 $m^2/g$, a loss on ignition of less than 0.1% by weight.

The third grade is "light-burn" or "caustic" magnesia, produced by calcining at temperatures of about 700° C. to about 1000° C. This type of magnesia is used in a wide range of applications, including plastics, rubber, paper and pulp processing, steel boiler additives, adhesives and acid neutralization. Examples of light burned magnesia include BAYMAG® 30, BAYMAG® 40, and BAYMAG® 30 (-325 Mesh) (each available from Baymag, Inc.).

Additives

A number of additives are useful to improve the properties of the finished article. Traditional amounts of additives are used. Except as noted, there are no known interactions of the catalyst or polysiloxane that interferes with the additives.

Example of additives include, but are not limited to, accelerator, set retarder, starch, dispersant, foaming agent, filler, biocides, wax emulsions, thickeners, fire retardants, and the like, and any combination thereof. The amounts of each to be included in the slurry and gypsum products described herein are provided in Tables 1 and 2, respectively.

Set retarders and/or set accelerators may be added to modify the rate at which the calcined gypsum hydration reactions take place. Set retarders (up to about 2 lb./MSF (9.8 $g/m^2$)) or dry accelerators (up to about 35 lb./MSF (170 $g/m^2$)) may be added to modify the rate at which the hydration reactions take place.

Potassium sulfate is a potential set accelerator. Calcium sulfate accelerator is a potential set accelerator, which may comprise 95% calcium sulfate dihydrate co-ground with 5% sugar and heated to 250° F. (121° C.) to caramelize the sugar, made according to U.S. Pat. No. 3,573,947. Wet ground accelerator (WGA) is a potential set accelerator made according to U.S. Pat. No. 6,409,825. WGA may include an organic phosphonic compound, a phosphate-containing compound or mixtures thereof. Heat resistant accelerator is a potential set accelerator comprising calcium sulfate dihydrate freshly ground with sugar at a ratio of about 5 to 25 pounds of sugar per 100 pounds of calcium sulfate dihydrate, further described in U.S. Pat. No. 2,078,199. Any one or more of these set accelerators may typically be employed in the invention.

Examples of set retarders include, but are not limited to, a sodium salt of polyacrylic acid, an acrylic acid sulfonic acid copolymer, an ammonium salt of an acrylic acid sulfonic acid copolymer, a sodium salt of an acrylic acid sulfonic acid copolymer, a blend of an acrylic acid polymer with a sulfonic acid copolymer and salts thereof, and the like, and any combination thereof. Commercially available retarders include, but are not limited, to ACCUMER™ (e.g., ACCUMER™ 9000 (an acrylic acid-based polymer), ACCUMER™ 9300 (a sodium salt of a polyacrylic acid), ACCUMER™ 9400 (a sodium salt of polyacrylic acid) each available from Rohm & Haas).

Starches, such as a pregelatinized starch, an acid-modified starch and/or a non-substituted starch, may be included in slurry and gypsum products described herein. The inclusion of starch(es) may increase the strength of the set and dried gypsum cast and may minimize or avoid the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch (available from Bunge North America), AMERIKOR 818 (available from Archer Daniels Midland Company), and HQM PREGEL (available from Archer Daniels Midland Company), and the like, and any combination thereof.

Dispersants are used to improve the flowability of the slurry and reduce the amount of water used to make the slurry. Any known dispersant is useful, including, but are not limited to, polycarboxylates, sulfonated melamines, naphthalene sulfonate, and the like, and any combination thereof. A typical naphthalene sulfonate dispersant is DAXAD® dispersants (available from Dow Chemical). A typical dispersant is a linear polycarboxylate dispersant of U.S. Pat. No. 10,442,732 to Vilinska et al.

Some embodiments may employ a foaming agent to yield voids in the set gypsum-containing product to provide lighter weight. In these embodiments, any of the conventional foaming agents known to be useful in preparing foamed set gypsum products can be employed. Many such foaming agents are well known and readily available commercially including the HYONIC® line of soaps (available from GEO Specialty Chemicals). A preferred method for preparing foamed gypsum products are disclosed in U.S. Pat. No. 5,683,635, herein incorporated by reference.

Examples of fillers may include, but are not limited to, paper fibers, glass fibers, vermiculite, clay, and the like, and any combination thereof.

Biocides may be employed to reduce growth of mold, mildew, or fungi. Depending on the biocide selected and the intended use for the gypsum products, the biocide can be added to the covering, the gypsum core, or both. Examples of biocides include, but are not limited to, boric acid, pyrithione salts, copper salts, and the like, and any combination thereof. Pyrithione is known by several names, including 2-mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$), known as sodium pyrithione (CAS Registry No. 3811-73-2), is one embodiment of this salt that is particularly useful. Pyrithione salts such as sodium OMADINE® or zinc OMADINE® are commercially available from Lonza.

Other known additives may be used as needed to modify specific properties of the product. For example, a trimetaphosphate compound is added to the slurry in some embodiments to enhance the strength of the gypsum product and to improve sag resistance of the set gypsum. Preferably, the concentration of the trimetaphosphate compound is from about 0.07% to about 2.0% based on the weight of the stucco in the slurry. Gypsum compositions including trimetaphosphate compounds are disclosed in U.S. Pat. Nos. 6,342,284 and 6,632,550, both herein incorporated by reference. Examples of trimetaphosphate salts include, but are not limited to, sodium, potassium, or lithium salts of trimetaphosphate. Typically the polyphosphate is sodium trimetaphosphate.

In another example, wax emulsions are used for water resistance. If stiffness is needed, boric acid is commonly added. Additionally, fire retardancy can be improved by the addition of vermiculite. These and other known additives are useful in the present slurry and gypsum products.

Water

Water is added to the slurry in any amount that makes a flowable aqueous gypsum slurry. The amount of water to be used varies greatly according to the application with which it is being used, the exact dispersant being used, the properties of the stucco, and the additives being used. The water to stucco ratio ("WSR") for gypsum products (e.g., wallboard) is typically about 0.2 to about 1.2:1 (preferably about 0.4 to about 0.9:1) based on the dry weight of the stucco.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for one of ordinary skill in the art and having benefit of this disclosure.

To facilitate a better understanding of the embodiments of the present invention, the following examples of preferred or representative embodiments are given. In no way should the following examples be read to limit, or to define, the scope of the invention.

CLAUSES OF THE INVENTION

The following clauses disclose various non-limiting aspects of the invention.

Clause 1. A gypsum panel having a core comprising: interwoven matrices of calcium sulfate dihydrate crystals and a silicone resin, wherein the interwoven matrices have dispersed throughout them a siloxane polymerization catalyst comprising: (a) 55 wt % to 100 wt % calcium aluminate cement and/or calcium aluminate cement and (b) 0 wt % to 45 wt % magnesium oxide; wherein the weight ratio of the siloxane polymerization catalyst to the calcium sulfate dihydrate is 0.01-5:100, wherein the gypsum panel comprises at least 50 wt. % calcium sulfate dihydrate, preferably at least 80 wt. % calcium sulfate dihydrate, typically at least 90 wt. % calcium sulfate dihydrate or typically at least 95 wt. % calcium sulfate dihydrate. The catalyst is the sole source of calcium aluminate cement, calcium sulfoaluminate cement and magnesium oxide in the panel.

Clause 2. The panel of clause 1, wherein the panel has an absence of fly ash and preferably also an absence of Portland cement.

Clause 3. The panel of any of clauses 1-2 comprising: 100 parts by weight calcium sulfate dihydrate; 0.01 to 5 parts by weight siloxane polymerization catalyst, wherein the catalyst comprises (a) 55 wt % to 100 wt % calcium aluminate cement and/or calcium sulfoaluminate cement and (b) 0 wt % to 45 wt % magnesium oxide; 0.2 to 2 parts by weight of the silicone resin; 0.1 to 5 parts by weight gypsum setting accelerator; and 0.1 to 2 parts by weight dispersant.

Clause 4. The panel of any of clauses 1-3, wherein the siloxane polymerization catalyst is present in an amount of 0.1-5 parts by weight per 100 parts by weight calcium sulfate dihydrate.

Clause 5. The panel of any of clauses 1-4, wherein the siloxane polymerization catalyst is present in an amount of 0.5-3 parts by weight per 100 parts by weight calcium sulfate dihydrate.

Clause 6. The panel of any of clauses 1-5, wherein the catalyst consists of (a) 55 wt % to 100 wt % calcium aluminate cement and/or calcium sulfoaluminate cement and (b) 0 wt % to 45 wt % magnesium oxide.

Clause 7. The panel of any of clauses 1-6, wherein the panel is free of one or more of: Portland cement, limestone, aragonite, calcite, dolomite, and slaked lime.

Clause 8. The panel of any of clauses 1-7, wherein the catalyst consists of calcium aluminate cement.

Clause 9. The panel of any of clauses 1-7, wherein the catalyst consists of calcium sulfoaluminate cement.

Clause 10. The panel of any of clauses 1-7, wherein the catalyst consists of calcium aluminate cement and calcium sulfoaluminate cement.

Clause 11. The panel of any of clauses 1-10, wherein the panel absorbs an amount equal to less than 11%, preferably less than 10% of its own weight, in water when immersed in water at 70° F. for two hours in accordance with ASTM Standard 1396-17 within 24 hours.

Clause 12. The panel of any of clauses 1-11, wherein the core further comprises an additive selected from the group consisting of: a biocide, a set retarder, a starch, a foaming agent, a filler, a wax emulsion, a thickener, a fire retardant, and any combination thereof.

Clause 13. A method for producing the gypsum panel of any of clauses 1-12 comprising:
making a siloxane emulsion with siloxane and water;
mixing a siloxane polymerization catalyst comprising (a) 55 wt % to 100 wt % calcium aluminate cement and/or calcium aluminate cement and (b) 0 wt % to 45 wt % magnesium oxide with calcium sulfate hemihydrate to form a siloxane polymerization catalyst/calcium sulfate hemihydrate mixture, wherein the weight ratio of the catalyst to the calcium sulfate hemihydrate is 0.01-5:100;
combining the siloxane emulsion with the catalyst/calcium sulfate hemihydrate mixture to prepare an aqueous gypsum slurry comprising at least 50 wt. % calcium sulfate hemihydrate on a water free basis;
shaping the aqueous gypsum slurry and allowing the aqueous gypsum slurry to set to form a set core of the gypsum panel; and
allowing the siloxane polymerization catalyst to polymerize the siloxane partially or fully. The catalyst is the sole source of calcium aluminate cement, calcium sulfoaluminate cement and magnesium oxide in the aqueous gypsum slurry. The calcium sulfate hemihydrate is preferably at least 80 wt. %, typically at least 90 wt. % or at least 95 wt. %, of the ingredients of the aqueous gypsum slurry on a dry (water free) basis.

Clause 14. The method of clause 13, wherein the aqueous gypsum slurry has an absence of fly ash and preferably also an absence of Portland cement.

Clause 15. The method of clause 13 or 14, wherein forming the aqueous gypsum slurry comprises:
mixing a mixture of:
100 parts by weight calcium sulfate hemihydrate;
0.01 to 5 parts by weight of siloxane polymerization catalyst, wherein the siloxane polymerization catalyst comprises (a) 55 wt % to 100 wt % of calcium aluminate cement and/or calcium sulfoaluminate cement and (b) 0 wt % to 45 wt % of magnesium oxide;
0.2 to 2 parts by weight of siloxane;
0.1 to 5 parts by weight gypsum setting accelerator;
0.1 to 2 parts by weight dispersant; and 50 to 150 parts by weight water;
depositing the aqueous gypsum slurry on a facing material; shaping the aqueous gypsum slurry on the facing material into a panel;
allowing the aqueous gypsum slurry to set, thereby forming the core of the gypsum panel; and
allowing the polymerizing of the siloxane.

Clause 16. The method of any of clauses 13-15, wherein the aqueous siloxane emulsion comprises dispersed siloxane particles having an average particle size of less than about 50 microns, and does not comprise an emulsifier or dispersant, preferably the siloxane particles, have, an average particle size of less than about 30 microns.

Clause 17. The method of any of clauses 13-16, wherein the shaping step comprises locating the aqueous gypsum slurry between two pieces of facing material to form a gypsum wallboard panel.

Clause 18. The method of any of clauses 13-17, wherein the slurry is free of Portland cement, fly ash, limestone, aragonite, calcite, dolomite, and slaked lime.

Clause 19. The method of any of clauses 13-18, wherein the siloxane polymerization catalyst consists of (a) 55 wt % to 100 wt % calcium aluminate cement and/or calcium sulfoaluminate cement and (b) 0 wt % to 45 wt % magnesium oxide.

Clause 20. The method of any of clauses 13-18, wherein the catalyst consists of calcium aluminate cement or wherein the catalyst consists of calcium sulfoaluminate cement.

Clause 21. An aqueous gypsum slurry composition comprising:
at least 50 wt. % calcium sulfate hemihydrate on a water free basis;
a siloxane polymerization catalyst comprising (a) 55 wt % to 100 wt % calcium aluminate cement and/or calcium aluminate cement and (b) 0 wt % to 45 wt % magnesium oxide, wherein the weight ratio of the siloxane polymerization catalyst to the calcium sulfate hemihydrate is 0.01-5:100; and
a siloxane emulsion with siloxane and water. The catalyst is the sole source of calcium aluminate cement, calcium sulfoaluminate cement and magnesium oxide in the aqueous gypsum slurry. The calcium sulfate hemihydrate is preferably at least 80 wt. %, typically at least 90 wt. % or at least 95 wt. %, of the ingredients of the aqueous gypsum slurry on a dry (water free) basis.

Clause 22. The aqueous gypsum slurry composition of clause 21 comprising:
100 parts by weight calcium sulfate hemihydrate;
0.01 to 5 parts by weight of siloxane polymerization catalyst, wherein the siloxane polymerization catalyst comprises (a) 55 wt % to 100 wt % of calcium aluminate cement and/or calcium sulfoaluminate cement and (b) 0 wt % to 45 wt % magnesium oxide;
0.2 to 2 parts by weight of siloxane;
0.1 to 5 parts by weight accelerator;
0.1 to 2 parts by weight dispersant; and
50 to 150 parts by weight water.

Clause 23. The aqueous gypsum slurry composition of clause 21 or 22, wherein the aqueous gypsum slurry has an absence of fly ash and preferably also an absence of Portland cement.

Clause 24. The aqueous gypsum slurry composition of any of clauses 21-23, wherein the aqueous gypsum slurry has an absence of one or more of: Portland cement, limestone, aragonite, calcite, dolomite, and slaked lime.

Clause 25. The aqueous gypsum slurry composition of any of clauses 21-23, wherein the siloxane polymerization catalyst is free of one or more of: Portland cement, limestone, aragonite, calcite, dolomite, and slaked lime.

Clause 26. The aqueous gypsum slurry composition of any of clauses 21-25, wherein the catalyst consists of (a) 55 wt % to 100 wt % calcium aluminate cement and/or calcium sulfoaluminate cement and (b) 0 wt % to 45 wt % magnesium oxide.

Clause 27. The aqueous gypsum slurry composition of any of clauses 21-25, wherein the catalyst consists of the calcium aluminate cement.

Clause 28. The aqueous gypsum slurry composition of any of clauses 21-25, wherein the catalyst consists of the calcium sulfoaluminate cement.

Clause 29. The aqueous gypsum slurry composition of any of clauses 21-25, wherein the catalyst consists of the calcium aluminate cement and the calcium sulfoaluminate cement.

EXAMPLES

Wallboard samples were prepared from slurries having the compositions described in Tables 7 and 8 according to the following procedure. All of the dry components (stucco, accelerator, starch, and catalyst) were placed in a plastic bag and shaken to mix. A siloxane emulsion was prepared by adding 8 g of siloxane in 200 g of water and mixing them in a high shear mixer at a rate of 7500 rpm for 2.5 minutes. The siloxane emulsion with the rest of water and all of the liquid additives were added into a HOBART® mixer. The slurry was prepared by soaking the dry powders in the solution for 10 seconds and mixing for 10 seconds, followed by injecting the foam for 14 seconds and mixing another 2 seconds. The slurry was then poured into a ½ inch by 13 inch by 12 inch envelope made by Manila face paper and Newsline back paper. The paper envelope was fixed in ½ inch envelope mold. After 5 minutes, the wet board were taken out of the mold and placed in the ambient condition for another 5 minutes. After 10 minutes, the board was dried in 450° F. oven for 17 minutes, and then transferred to 360° F. oven and dried for 17 minutes. Finally, the board was dried at 110° F. until the board weight became constant. The dried board was cut into 10 inch by 10 inch sample. For each of the samples, the board properties were a thickness of about ½ inch and a weight of about 1350 pounds per 1,000 square feet (lbs/msf).

TABLE 7

Sample Compositions

| Component | Parts by Weight |
| --- | --- |
| Stucco | 1000 |
| Heat resistance accelerator | 12 |
| Starch | 10 |
| Catalyst | 0-16 (See Table 8) |
| Siloxane | 9 |
| Sodium Trimetaphosphate (10% active ingredient) | 10 |
| Set Retarder (1% active ingredient) | 8 |
| Dispersant | 4 |
| Gauge water | 912 |

TABLE 8

Catalyst Compositions (parts by weight in Table 7)

| Sample | Class C Fly Ash | TERNAL® EV | SECAR® 71 | FASTROCK 500 | MgO |
| --- | --- | --- | --- | --- | --- |
| 1 | 0 | 0 | 0 | 0 | 0 |
| 2 | 16 | 0 | 0 | 0 | 0 |
| 3 | 0 | 16 | 0 | 0 | 0 |
| 4 | 0 | 0 | 16 | 0 | 0 |
| 5 | 0 | 0 | 0 | 16 | 0 |
| 6 | 0 | 0 | 0 | 0 | 1.5 |
| 7 | 5 | 0 | 0 | 0 | 1.5 |
| 8 | 0 | 5 | 0 | 0 | 1.5 |
| 9 | 0 | 0 | 5 | 0 | 1.5 |
| 10 | 0 | 0 | 0 | 5 | 1.5 |
| 11 | 0 | 0 | 0 | 0 | 1 |
| 12 | 0 | 5 | 0 | 0 | 1 |
| 13 | 0 | 0 | 5 | 0 | 1 |
| 14 | 0 | 0 | 0 | 5 | 1 |

TERNAL® EV (calcium aluminate cement, available from Kerneos), SECAR® 71 (calcium aluminate cement, available from Kerneos), FASTROCK 500 (calcium sulfoaluminate cement, available from Kerneos).

The 10 inch by 10 inch sample boards were soaked in water for two hours for the water absorption test as specified in ASTM C1396-17. The weight gain during the soaking was used to calculate the water absorption. Table 9 reports $H_2O$ % of Mass which is the water absorption of the sample boards. For instance, an $H_2O$ % of Mass of 57.4 means that, per 100 pounds of dry board before the water absorption test, the wet board after the water absorption test weighed 157.4 pounds.

TABLE 9

ASTM C1396-17 Test Results

| Sample | $H_2O$ % of Mass |
| --- | --- |
| 1 | 57.4 |
| 2 | 5.7 |
| 3 | 5.9 |
| 4 | 6.7 |
| 5 | 5.6 |
| 6 | 6.0 |
| 7 | 4.8 |
| 8 | 4.6 |
| 9 | 4.5 |
| 10 | 4.8 |
| 11 | 6.3 |
| 12 | 5.2 |
| 13 | 5.1 |
| 14 | 5.4 |

The board samples produced using calcium aluminate cement-containing catalysts are comparable in water resistance to those produced with fly ash-containing catalysts.

Therefore, the present disclosure is well adapted to attain the ends and advantages mentioned as well as those that are inherent therein.

The particular disclosure above is illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below.

The invention claimed is:

1. A gypsum panel having a core comprising:
   interwoven matrices of calcium sulfate dihydrate crystals and a silicone resin, wherein the silicon resin is formed from polymerization of siloxane, wherein the interwoven matrices have dispersed throughout them a siloxane polymerization catalyst consisting of:
   (a) 55 wt % to 100 wt % calcium aluminate cement and/or calcium sulfoaluminate cement,
   wherein the calcium aluminate cement is 30 to 80 wt % $Al_2O_3$ wherein at least one phase of calcium aluminate in the calcium aluminate cement is monocalcium aluminate, dodecacalcium hepta-aluminate and/or calcium dialuminate, wherein at least a portion of the calcium aluminate cement is at least one calcium silicate compound, wherein at least a portion of the calcium aluminate cement is at least one calcium ferrite compound,
wherein the calcium sulfoaluminate cement is 30 to 80 wt % anhydrous calcium sulfoaluminate having formula $4CaO \cdot 3Al_2O_3 \cdot CaSO_4$, wherein at least 30 to 75 wt % of the calcium sulfoaluminate cement is $Ca_4(AlO_2)_6SO_4$, wherein at least a portion of the calcium sulfoaluminate cement is at least one of dicalcium silicate ($2CaO \cdot SiO_2$), gypsum ($CaSO_4 \cdot 2H_2O$), and aluminoferrite ($4CaO \cdot Al_2O_3Fe_2O_3$); and
(b) 0 wt % to 45 wt % and magnesium oxide;
wherein the weight ratio of the siloxane polymerization catalyst to the calcium sulfate dihydrate is 0.5-5:100, wherein the gypsum panel comprises at least 50 wt. % calcium sulfate dihydrate; and
at least one additive selected from the group consisting of: biocide, set retarder, set accelerator, starch, dispersant, foaming agent, filler, wax emulsion, thickener, fire retardant, latex binder, sugar, phosphates, phosphonates, borates and colorants,
wherein a water-resistance agent in the core consists of the silicon resin and optionally the wax emulsion.

2. The panel of claim 1, wherein the panel has an absence of fly ash, wherein surface area of the calcium aluminate cement is 4,000 to 6,000.

3. The panel of claim 1 comprising:
100 parts by weight of the calcium sulfate dihydrate;
0.5 to 5 parts by weight of siloxane polymerization catalyst, wherein the siloxane polymerization catalyst comprises (a) 55 wt % to 100 wt % calcium aluminate cement and/or calcium sulfoaluminate cement and (b) 0 wt % to 45 wt % magnesium oxide;
0.2 to 2 parts by weight silicone resin;
0.1 to 5 parts by weight gypsum setting accelerator;
0.1 to 2 parts by weight dispersant.

4. The panel of claim 1, wherein the siloxane polymerization catalyst is present in an amount of 0.5-5 parts by weight per 100 parts by weight calcium sulfate dihydrate.

5. The panel of claim 1, wherein the siloxane polymerization catalyst is present in an amount of 0.5-3 parts by weight per 100 parts by weight calcium sulfate dihydrate.

6. The panel of claim 1, wherein the catalyst consists of (a) 55 wt % to 100 wt % calcium aluminate cement and/or calcium sulfoaluminate cement and (b) 0 wt % to 45 wt % magnesium oxide.

7. The panel of claim 1, wherein the siloxane polymerization catalyst is free of Portland cement, limestone, aragonite, calcite, dolomite, and slaked lime.

8. The panel of claim 1, wherein the catalyst consists of calcium aluminate cement.

9. The panel of claim 1, wherein the catalyst consists of calcium sulfoaluminate cement.

10. The panel of claim 1, wherein the catalyst consists of calcium aluminate cement and calcium sulfoaluminate cement.

11. The panel of claim 1, wherein the panel absorbs an amount not more than 10 weight % of its own weight in water when immersed at 70° F. for two hours in accordance with ASTM Standard C1396/C1396M-17.

12. The panel of claim 1, wherein the core further comprises an additive selected from the group consisting of: a biocide, a set retarder, a starch, a foaming agent, a filler, a wax emulsion, a thickener, a fire retardant, and any combination thereof.

13. A method for producing the gypsum panel of claim 1, comprising:
making a siloxane emulsion with siloxane and water;
mixing a siloxane polymerization catalyst comprising (a) 55 wt % to 100 wt % calcium aluminate cement and/or calcium aluminate cement and (b) 0 wt % to 45 wt % and magnesium oxide with calcium sulfate hemihydrate to form a siloxane polymerization catalyst/calcium sulfate hemihydrate mixture, wherein the weight ratio of the siloxane polymerization catalyst to the calcium sulfate hemihydrate is 0.1-5:100;
combining the siloxane emulsion with the siloxane polymerization catalyst/calcium sulfate hemihydrate mixture to prepare an aqueous gypsum slurry comprising at least 50 wt. % calcium sulfate hemihydrate on a water free basis;
shaping the aqueous gypsum slurry and allowing the aqueous gypsum slurry to set to form a set core of the gypsum panel; and
allowing the siloxane polymerization catalyst to polymerize the siloxane partially or fully.

14. The method of claim 13, wherein the aqueous gypsum slurry has an absence of fly ash.

15. The method of claim 13, wherein forming the aqueous gypsum slurry comprises:
mixing a mixture of:
100 parts by weight calcium sulfate hemihydrate;
0.5 to 5 parts by weight of siloxane polymerization catalyst, wherein the catalyst comprises (a) 55 wt % to 100 wt % of calcium alum inate cement and/or calcium sulfoaluminate cement and (b) 0 wt % to 45 wt % of magnesium oxide;
0.2 to 2 parts by weight of siloxane;
0.1 to 5 parts by weight gypsum setting accelerator;
0.1 to 2 parts by weight dispersant; and
50 to 150 parts by weight water;
depositing the aqueous gypsum slurry on a facing material;
shaping the aqueous gypsum slurry on the facing material into a panel;
allowing the aqueous gypsum slurry to set, thereby forming the core of the gypsum panel; and
allowing the polymerizing of the siloxane.

16. The method of claim 13, wherein the aqueous siloxane emulsion comprises dispersed siloxane particles having an average particle size of less than about 50 microns, and does not comprise an emulsifier or dispersant.

17. The method of claim 13, wherein the shaping step comprises locating the aqueous gypsum slurry between two pieces of facing material to form a gypsum wallboard panel, wherein the slurry is free of Portland cement, fly ash, limestone, aragonite, calcite, dolomite, and slaked lime.

18. The method of claim 13, wherein the siloxane polymerization catalyst consists of (a) 55 wt % to 100 wt % of the calcium aluminate cement and/or the calcium sulfoaluminate cement and (b) 0 wt % to 45 wt % and of magnesium oxide.

19. A gypsum panel having a core consisting of:
interwoven matrices of calcium sulfate dihydrate crystals and a silicone resin, wherein the silicon resin is formed from polymerization of siloxane, wherein the interwoven matrices have dispersed throughout them a siloxane polymerization catalyst consisting of:
(a) 55 wt % to 100 wt % calcium aluminate cement and/or calcium sulfoaluminate cement,
wherein the calcium aluminate cement is 30 to 80 wt % $Al_2O_3$, wherein at least one phase of calcium aluminate in the calcium aluminate cement is monocalcium aluminate, dodecacalcium hepta-aluminate and/or calcium dialuminate, wherein at least a portion of the calcium aluminate cement is at least one calcium silicate compound, wherein at least a portion of the calcium aluminate cement is at least one calcium ferrite compound, wherein the calcium sulfoaluminate cement is 30 to 80 wt % anhydrous calcium sulfoaluminate having formula $4CaO \cdot 3Al_2O_3 \cdot CaSO_4$, wherein at least 30 to 75 wt % of the calcium sulfoaluminate cement is $Ca_4(AlO_2)_6SO_4$, wherein at least a portion of the calcium sulfoaluminate cement is at least one of dicalcium silicate ($2CaO \cdot SiO_2$), gypsum ($CaSO_4 \cdot 2H_2O$), and aluminoferrite ($4CaO \cdot Al_2O_3 \cdot Fe_2O_3$); and (b) 0 wt % to 45 wt % and magnesium oxide;

wherein the weight ratio of the siloxane polymerization catalyst to the calcium sulfate dihydrate is 0.5-5:100, wherein the gypsum panel comprises at least 50 wt. % calcium sulfate dihydrate;

and at least one additive selected from the group consisting of: biocide, set retarder, set accelerator, starch, dispersant, foaming agent, filler, wax emulsion, thickener, fire retardant, latex binder, sugar, phosphates, phosphonates, borates and colorants.

* * * * *